US006700043B2

(12) United States Patent
Hirayama

(10) Patent No.: US 6,700,043 B2
(45) Date of Patent: Mar. 2, 2004

(54) ELECTRIC GUITAR WITH TREMOLO UNIT

(75) Inventor: Shinjiro Hirayama, Seto (JP)

(73) Assignee: Hoshino Gakki Co., LTD (JP)

( * ) Notice: Subject to any disclaimer, the term of this patent is extended or adjusted under 35 U.S.C. 154(b) by 0 days.

(21) Appl. No.: 10/171,445

(22) Filed: Jun. 13, 2002

(65) Prior Publication Data

US 2003/0066408 A1 Apr. 10, 2003

(30) Foreign Application Priority Data

Oct. 9, 2001 (JP) ...................................... 2001-311521

(51) Int. Cl.$^7$ .................................................. G01D 3/06

(52) U.S. Cl. ..................... 84/314 N; 84/314 R; 84/293; 84/318

(58) Field of Search ........................... 84/314 N, 314 R, 84/293, 318

(56) References Cited

U.S. PATENT DOCUMENTS 4,171,661 A 10/1979 Rose ........................... 84/313
4,517,874 A * 5/1985 Fender ..................... 84/314 N
4,829,873 A * 5/1989 Suzuki et al. ............. 84/314 N
5,932,822 A * 8/1999 Bernstein .................. 84/314 N

* cited by examiner

*Primary Examiner*—Shih-Yung Hsieh
(74) *Attorney, Agent, or Firm*—Ostrolenk, Faber, Gerb & Soffen, LLP

(57) ABSTRACT

An electric guitar with a tremolo unit that makes it easy to tune strings and install the strings. The electric guitar includes a lock device that prevents the strings from being shifted to offset positions. The lock device has a nut, which has an inclined support surface, and a clamp pad. The clamp pad clamps the strings with respect to the support surface. A front edge of the nut is located upward from a line, which extends along a contact point between pegs and the strings and a rear edge of the nut. Since the strings are bent by the nut at the front and rear edges, the strings are stopped from being separated from the support surface.

11 Claims, 5 Drawing Sheets

ELECTRIC GUITAR WITH TREMOLO UNIT

BACKGROUND OF THE INVENTION

The present invention relates to electric guitars with tremolo units, and, more particularly, to lock devices that are attached to electric guitars to prevent strings from being shifted to offset positions.

In an electric guitar with a tremolo unit, tensions of all strings are adjusted at the same time by the tremolo unit for generating an impressive sound effect. The U.S. Pat. Publication No. 4,171,661 describes a conventional electric guitar, which maintains tuning of the guitar in a stable state even when a tremolo sound effect is used. More specifically, a tremolo unit of the electric guitar includes a saddle that locks proximal ends of strings. Further, with reference to FIG. 6, a lock device 30, which is fixed near the head of the guitar, locks distal portions of the strings 15. As locked by the lock device 30, the strings 15 cannot be tuned by pegs. Thus, to enable the strings 15 to be finely tuned even in this state, the guitar is provided with a fine tuning device, which is located at the saddle of the tremolo unit.

With reference to FIGS. 6 and 7, the lock device 30 includes a nut 31, which is fixed to an upper side of a neck 13 of the guitar, and clamp pads 32. The nut 31 supports the clamp pads 32. The clamp pads 32 are pressed against an upper side (a support surface 31*a*) of the nut 31 by fastening bolts 33, such that the strings 15 are clamped between the clamp pads 32 and the support surface 31*a*. The support surface 31*a* of the nut 31 is inclined with respect to a hypothetical line L1, which extends along an edge of the nut 31 close to the proximal ends of the strings 15 (a contact point P1) and the proximal ends of the strings 15 (a contact point P2 between the tremolo unit and the strings 15), at angle α. The angle α is, for example, five degrees. A hypothetical line L2, which extends along the contact point P1 and a front edge of the nut 31 (a contact point P3), is parallel with a hypothetical line L3, which extends along a contact point P4 between the strings 15 and pegs (not illustrated) and the contact point P1. The head 14 is bent with respect to the neck 13 at angle γ. The angle γ is, for example, 10 degrees.

In the lock device 30, the support surface 31*a* of the nut 31 is parallel with the line L3. The strings 15 are thus easily separated from the support surface 31*a*. In this case, tuning of the strings 15 becomes unstable. Also, the strings 15 are easily shifted to offset positions. Accordingly, to avoid these problems, the clamp pads 32 need be firmly pressed against the nut 31 by the fastening bolts 33 such that the strings 15 are reliably held by the support surface 31*a*. However, this may damage the strings 15 and decrease the durability of the fastening bolts 33 or damage the bolts 33.

Further, to solve the problems, the electric guitar may include a retainer bar, which is located between the lock device 30 and the pegs for pressing the strings 15 against an upper side of the head 14. However, in this case, when installing the strings 15, the fastening bolts 33 and the clamp pads 32 must be removed from the nut 31. The strings 15 are then passed through the space between the retainer bar and the head 14. This complicates the installation of the strings 15.

SUMMARY OF THE INVENTION

Accordingly, it is an objective of the present invention to provide an electric guitar with a tremolo unit that maintains tuning of strings in a stable state and prevents the strings from being shifted to offset positions.

It is another objective of the present invention to provide an electric guitar with a tremolo unit and a lock device that makes it easy to install strings.

To achieve the foregoing and other objectives and in accordance with the purpose of the present invention, the invention provides an electric guitar with a tremolo unit that adjusts tensions of strings at the same time. The electric guitar includes a body, a neck, a head, a plurality of pegs, and a lock device. The body fixes proximal ends of the strings. The neck projects from the body and has an upper side that faces the strings. The head is fixed to a distal end of the neck and is bent downward from the upper side of the neck. The pegs are attached to the head. Each of the pegs is connected to a distal end of a different one of the strings. The lock device is fixed to the upper side of the neck for preventing strings from being shifted to offset positions. The lock device includes a nut, a pad, and a bolt. The nut has a support surface that supports the strings, a rear edge close to the body, and a front edge close to the pegs. The nut is located such that the front edge is located upward from a hypothetical line that extends along a contact point between the strings and the pegs and the rear edge. The pad presses at least one of the strings against the support surface. The bolt connects the pad to the nut.

Another perspective of the invention is an electric guitar with a tremolo unit that adjusts tensions of strings at the same time. The electric guitar includes a neck, a plurality of pegs, and a nut. The neck has an upper side that faces the strings. Each of the pegs is connected to a distal end of a different one of the strings. The nut is attached to the upper side of the neck. The nut supports the strings such that the strings are substantially parallel with one another. The nut has a front edge close to the distal ends of the strings, a rear edge close to proximal ends of the strings, and a support surface formed between the front edge and the rear edge. The support surface is inclined with respect to the upper side of the neck at a predetermined angle. The predetermined angle is smaller than an angle of portions of the strings between the pegs and the front edge with respect to the upper side of the neck.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objectives and advantages thereof, may best be understood by reference to the following description of the presently preferred embodiments together with the accompanying drawings in which.

DETAILED DESCRIPTION OF THE PREFERED EMBODIMENTS

An electric guitar 11 of an embodiment of the present invention will now be described with reference to FIGS. 1 to 5.

Figure 5:
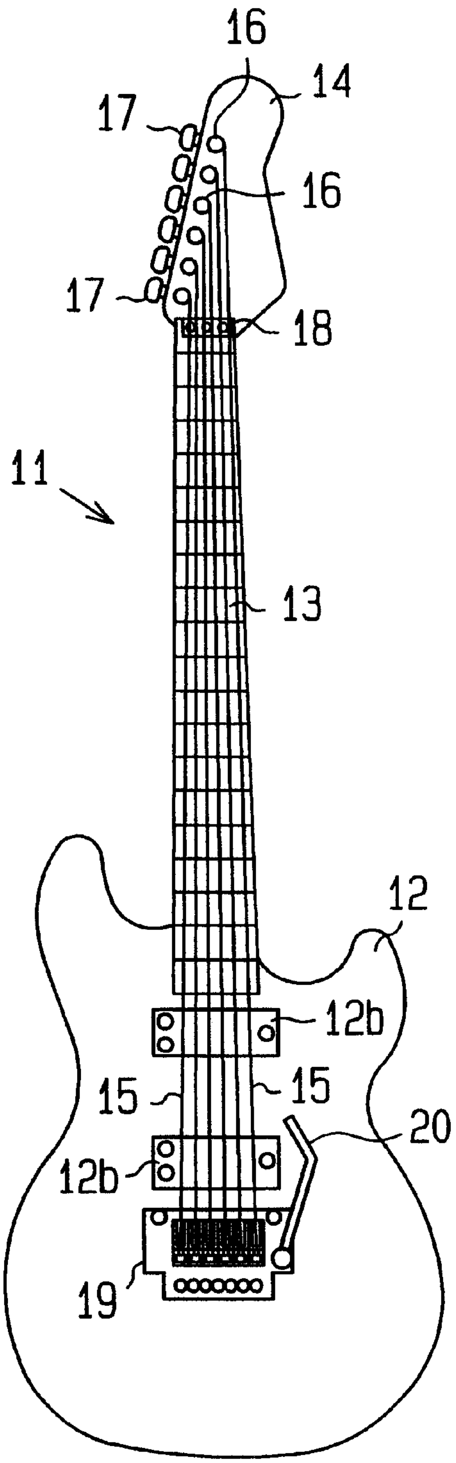
FIG. 5 is a plan view showing the electric guitar according to the embodiment of the present invention.
Figure 6:
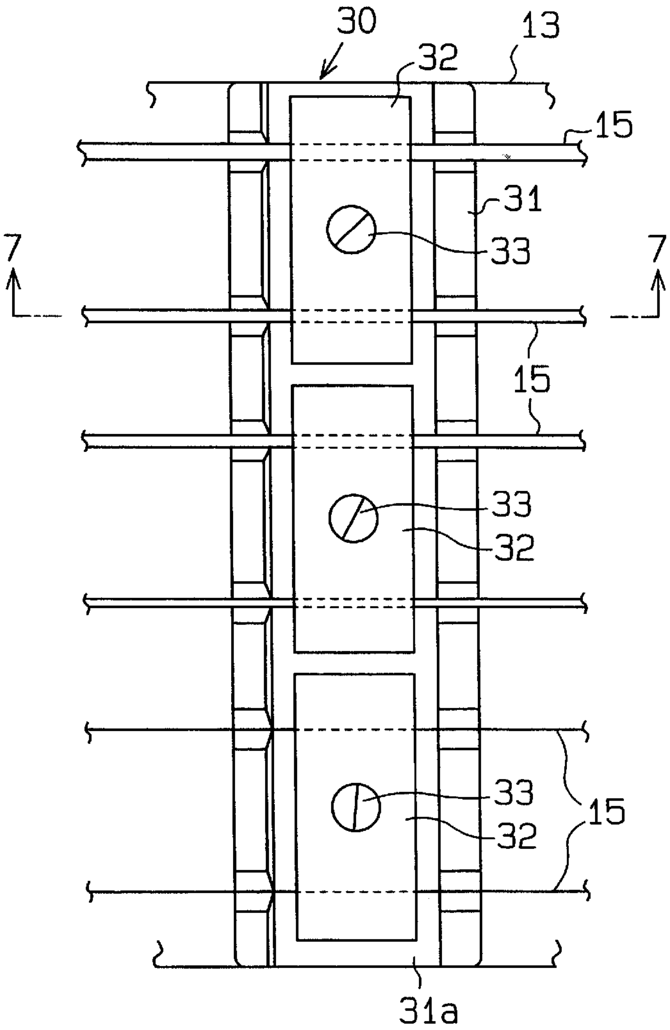
Fig.6 (Prior Art)
FIG. 6 is a plan view showing a prior art lock device of an electric guitar.
Figure 7:
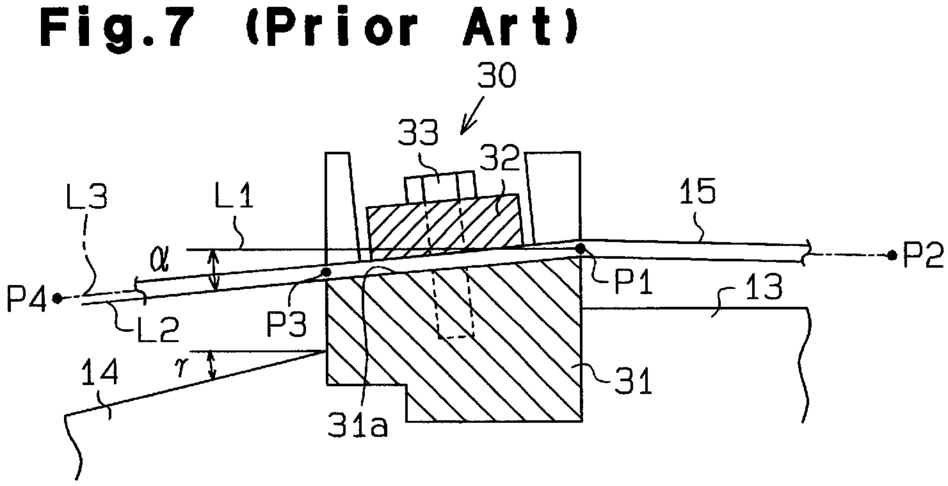
Fig.7 (Prior Art)
FIG. 7 is a cross-sectional view taken along line 7—7 of FIG. 6.

FIG. 5 is a plan view showing the electric guitar 11. In the following description, a side of the electric guitar 11 close to a viewer of the drawing is defined as an upper side of the electric guitar 11.

Figure 1:
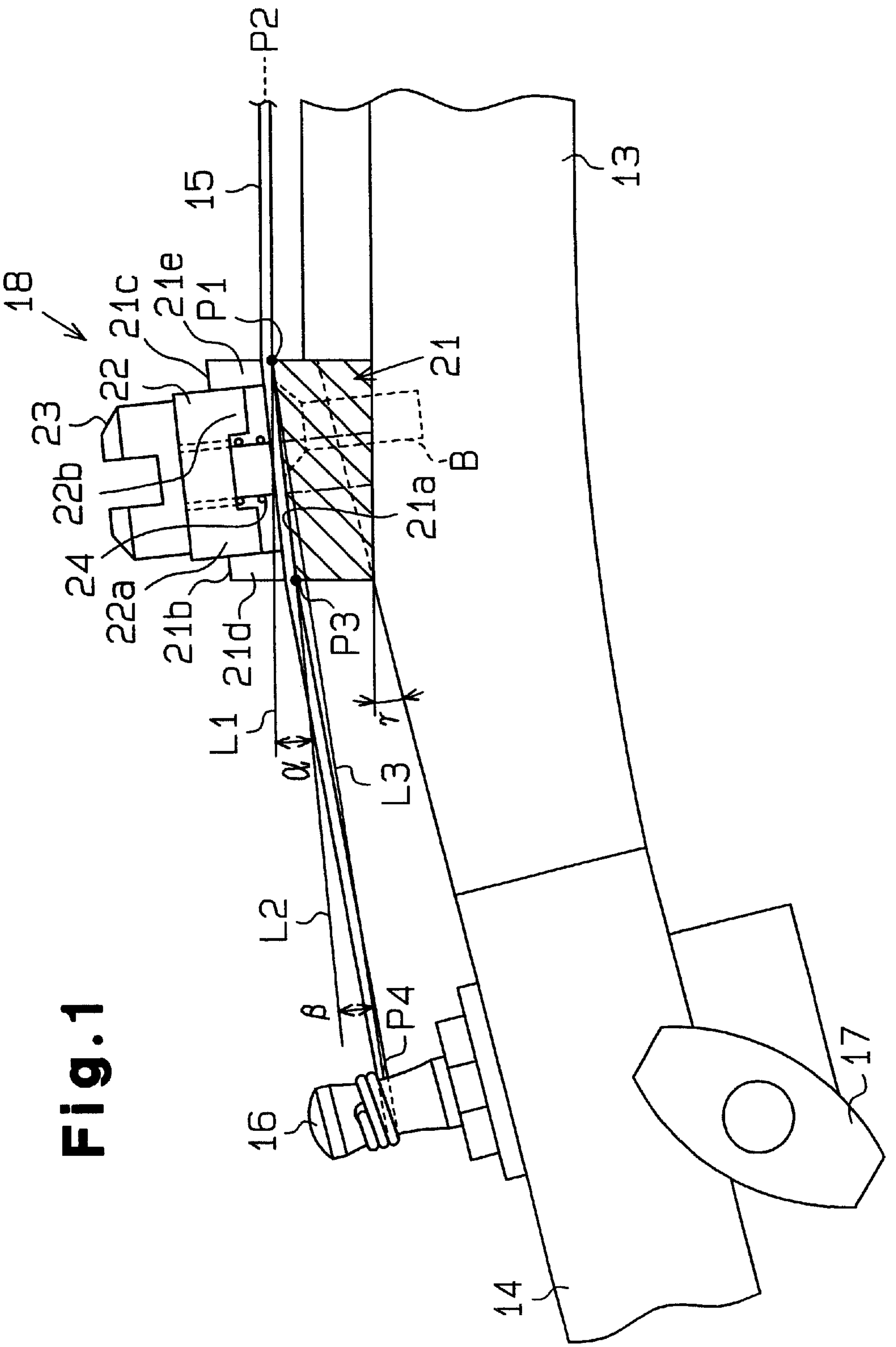
FIG. 1 is an enlarged view showing a lock device for strings according to an embodiment of the present invention.

The electric guitar 11 includes six strings 15, a solid type body 12, a neck 13, and a head 14. Proximal ends of the strings 15 are fixed to the body 12. The neck 13 projects from the body 12, while the head 14 is attached to a distal end of the neck 13. The head 14 includes six pegs 16 and six knobs 17. Each of the strings 15 is associated with a different one of the pegs 16, and the distal end of each string 15 is wound around the associated peg 16. Likewise, each of the knobs 17 is associated with a different one of the pegs 16. A gear mechanism (not illustrated) connects each knob 17 to the associated peg 16. In FIG. 1, only the peg 16 closest to the neck 13 is illustrated. The knobs 17 are manipulated to rotate the associated pegs 16. This adjusts tensions of the strings 15 such that the pitches of the strings 15 are tuned. A lock device 18, which is attached to an upper side of the neck 13, locks the strings 15 without affecting the tensions of the strings 15.

A tremolo unit 19 is attached to the body 12. Between the tremolo unit 19 and the lock device 18, the strings 15 are held substantially parallel with the upper side of the neck 13 and extend substantially parallel with one another. Pickups 12*b*, each of which converts vibration of an associated one of the strings 15 to an electric signal, are attached to the body 12. The electric signal is sent to an amplifier by a cable (not illustrated) and is amplified and converted to a sound by the amplifier.

The tremolo unit 19 includes a tremolo arm 20. The tremolo arm 20 is manipulated to adjust tensions of all strings 15 at the same time. This generates an impressive sound effect.

The lock device 18 will hereafter be described.

Figure 2:
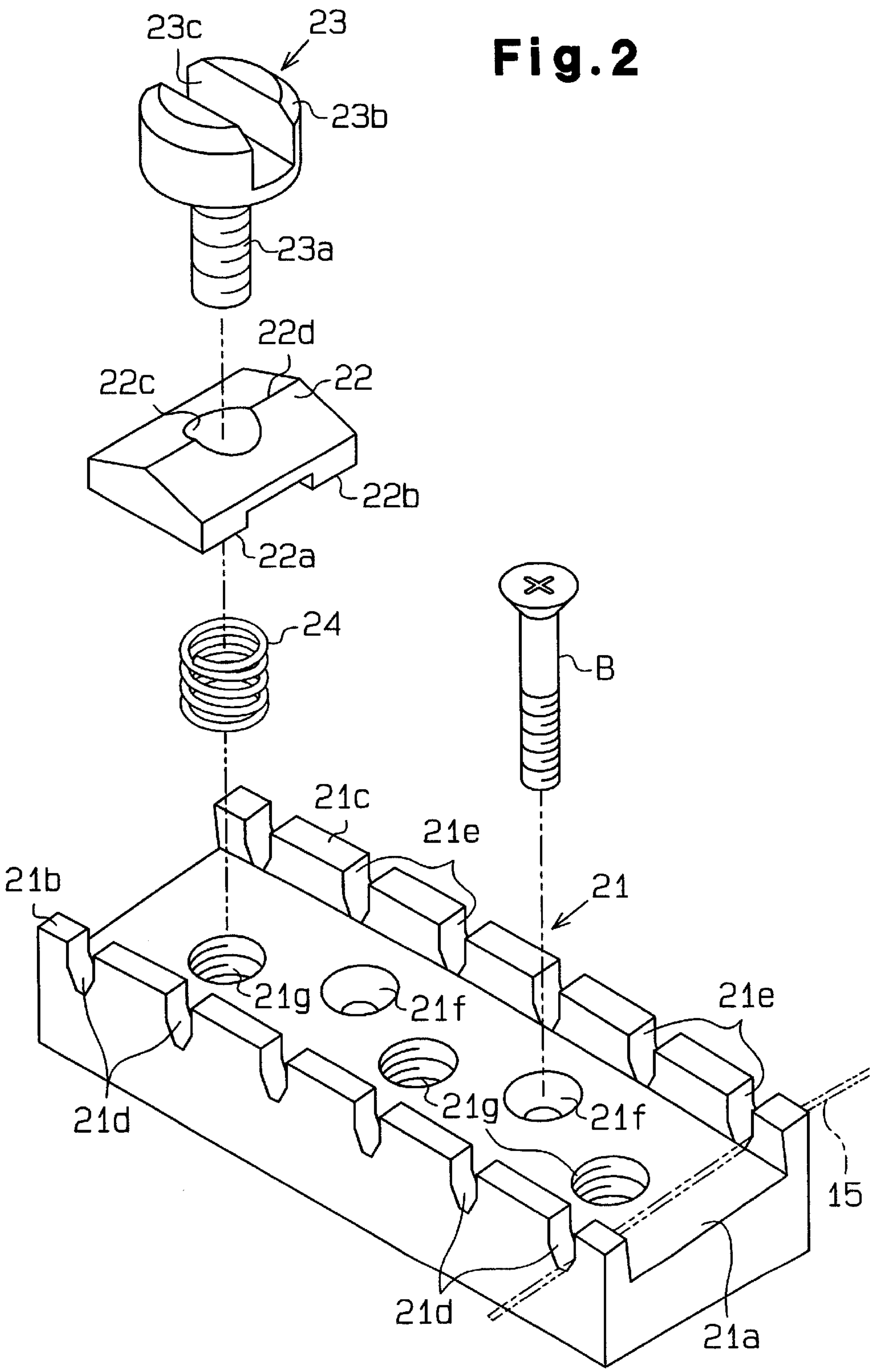
FIG. 2 is an exploded perspective view showing the lock device of FIG. 1.
Figure 3:
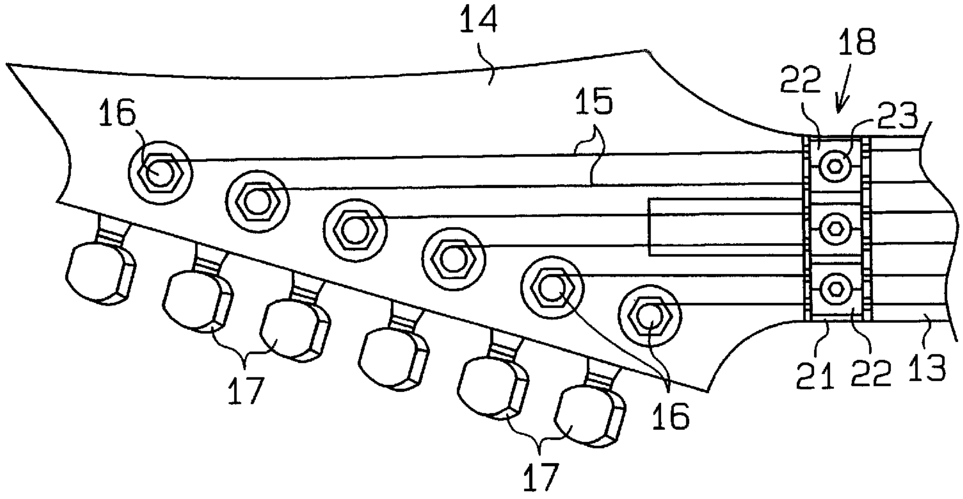
FIG. 3 is a plan view showing a head of an electric guitar according to the embodiment of the present invention.
Figure 4:
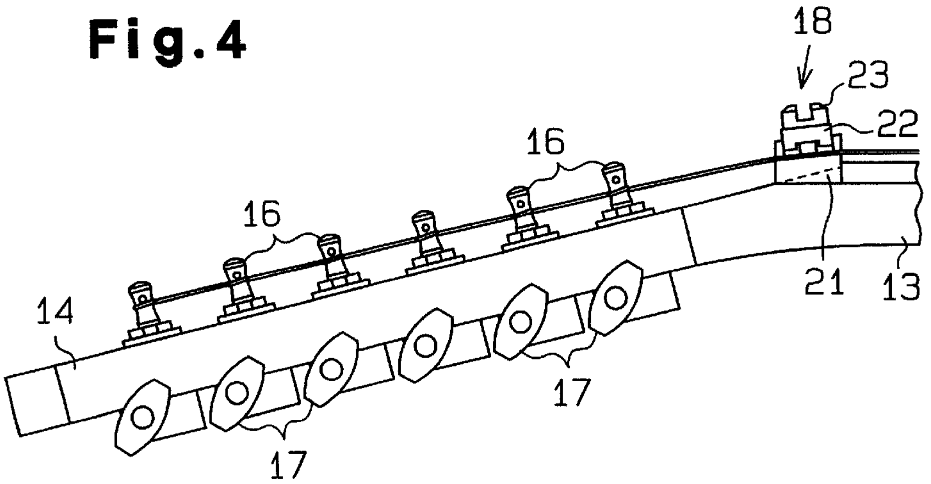
FIG. 4 is a side view showing the head of the electric guitar.

With reference to FIG. 1, a plurality of bolts B secures a nut 21 to the upper side of the neck 13. The nut 21, as shown in FIG. 2, includes a distal guide wall 21*b*, a proximal guide wall 21*c*, and a support surface 21*a*. The distal guide wall 21*b* and the proximal guide wall 21*c* respectively include guide grooves 21*d* and guide grooves 21*e*, which guide the strings 15. The support surface 21*a* is formed between the guide walls 21*b*, 21*c* for supporting the strings 15. Securing holes 21*f*, which are formed in the support surface 21*a*, receive the bolts B.

Clamp pads 22, which press the strings 15 against the support surface 21*a* of the nut 21, are fixed to the nut 21 by clamp bolts 23. The clamp bolts 23 each include a threaded shaft 23*a*, which is engaged with a through hole 22*c* formed in each of the clamp pads 22. A pair of pressing projections 22*a*, 22*b* projects from a lower side of each clamp pad 22 to face the support surface 21*a* of the nut 21. The strings 15 are clamped between the pressing projections 22*a*, 22*b* and the support surface 21*a* of the nut 21. Each clamp pad 22 has two upper side sections that are uniformly slanted in opposite directions with respect to a ridge 22*d*. The clamp pads 22 are fixed to the nut 21 such that the ridges 22*d* are substantially parallel with the strings 15. A groove 23*c* is formed in a head 23*b* of each clamp bolt 23. The clamp bolt 23 is thus easily rotated by a coin, for example, which is engaged with the groove 23*c*.

A coil spring 24 is located between the nut 21 and each clamp pad 22 and serves as an elastic member for urging the clamp pad 22 upward.

In the following description, with reference to FIG. 1, a rear edge of the nut 21 close to the body 12 is defined as a first contact point P1, a bridge saddle of the tremolo unit 19 is defined as a second contact point P2, and a front edge of the nut 21 close to the peg 19 is defined as a third contact point P3. A contact point between the peg 16 and the string 15 is defined as an engaging point P4. A line that extends along the first contact point P1 and the second contact point P2 is indicated by L1. A line that extends along the first contact point P1 and the third contact point P3 is indicated by L2. A line that extends along the first contact point P1 and the engaging point P4 is indicated by L3. The inclination angle of the line L2 with respect to the line L1 is indicated by $\alpha$, and the inclination angle of the line L3 with respect to the line L2 is indicated by $\beta$. The bending angle of the head 14 with respect to the neck 13 (the line L1) is indicated by $\gamma$.

It is preferred that the inclination angle $\alpha$ be 2.0–12.5 degrees. In this embodiment, the inclination angle $\alpha$ is 4.2 degrees. Likewise, it is preferred that the inclination angle $\beta$ be 2.0–12.5 degrees. In this embodiment, the inclination angle $\beta$ is 5.0 degrees. The bending angle $\gamma$ is generally 10.0–18.0 degrees and, in this embodiment, is 14.0 degrees. The interval between the third contact point P3 and the line L3 is changed in relation to the angles $\alpha$, $\beta$, $\gamma$. For example, the third contact point P3 is spaced from the line L3 by, for example, 0.5 to 3.5 millimeters.

If the bending angle $\gamma$ is 14.0 degrees, it is preferred that the inclination angle $\alpha$ be 3.0–7.0 degrees and the inclination angle $\beta$ be 3.0–7.0 degrees. In this embodiment, the pegs 16 at the standard height of 9.5 millimeters are used. Further, the interval between the contact points P1, P3 is 15.5 millimeters, while the interval between the contact point P3 and the engaging point P4 is 36.5 millimeters. In addition, a minimum value of the inclination angle $\alpha$ and a minimum value of the inclination angle $\beta$ are both set at 3.0 degrees such that the friction resistance between the strings 15 and the nut 21 exceeds a required minimum level. However, if the pegs 16 at the standard height of 3.7 millimeters, which are relatively short, are used, a maximum value of the inclination angle $\alpha$ and a maximum value of the inclination angle $\gamma$ are both set at 7.0 degrees such that the friction resistance between the strings 15 and the nut 21 exceeds the required minimum level. For example, if the inclination angles $\alpha$, $\beta$ are both 3.0 degrees, the string 15 is spaced from the line L3 at the contact point P3 by 0.8 millimeters. Likewise, if the inclination angles $\alpha$, $\beta$ are both 7.0 degrees, the string 15 is spaced from the line L3 at the contact point P3 by 1.5 millimeters.

The operation of the lock device 18 will hereafter be described.

When installing the strings 15, the clamp bolts 23 are loosened to separate the clamp pads 22 from the support surface 21*a* of the nut 21 at a predetermined interval. In this state, one end of each string 15 is fixed to the bridge saddle of the tremolo unit 19, while the other is passed through an associated one of the guide grooves 21*e*. This end is then passed through the space between the support surface 21*a* of the nut 21 and the lower side of the associated clamp pad 22 and the guide groove 21*d*. The end of the string 15 is thus engaged with the associated peg 16. Subsequently, while maintaining the clamp pads 22 as separated from the support surface 21*a*, the knobs 17 are manipulated to rotate the pegs 16 such that a predetermined tension is applied to each string 15 to tune the pitch of the string 15. In this state, the strings 15 contact the support surface 21*a* of the nut 21 at the first contact point P1 and the third contact point P3 in a bent manner. The strings 15 are fixed to the nut 21 by fastening the clamp pads 22 to the support surface 21*a* of the nut 21 by the clamp bolts 23.

The advantages of the lock device 18 are as follows.

(1) In the illustrated embodiment, the inclination angle β is 2.0–12.5 degrees and the third contact point P3 is spaced upward from the line L3 by 0.5–3.5 millimeters. The strings 15 are thus bent by the nut 21 at the first and third contact points P1, P3. This firmly holds the strings 15 in a state supported by the support surface 21*a* of the nut 21, without using a retainer. The friction resistance between the nut 21 and the strings 15 is thus increased. This maintains tuning of the strings 15 in a stable state and prevents the strings 15 from being shifted to offset positions.

Further, the clamp pads 22 press the strings 15 against the support surface 21*a* of the nut 21. Thus, without using a retainer, the tuning of the strings 15 is maintained in the stable state while the strings 15 are prevented from being shifted to offset positions. Also, the clamp pads 22 prevent the strings 15 from being longitudinally shifted to offset positions when the strings 15 are being locked. In addition, since it is unnecessary to fasten the clamp pads 22 by excessive force, the strings 15 are prevented from being damaged.

(2) In the illustrated embodiment, the support surface 21*a* of the nut 21 is flat. It is thus easy to fabricate the nut 21 such that the third contact point P3 is located upward from the line L3.

(3) In the illustrated embodiment, the clamp pads 22 each include two pressing projections 22*a*, 22*b*. The projections 22*a*, 22*b* press the strings 15 against the support surface 21*a* of the nut 21 at two positions. This enables the clamp pads 22 to reliably clamp the strings 15 near the first contact point P1 and the third contact position P3. The strings 15 thus reliably contact the nut 21 at the first and third contact points P1, P3.

(4) In the illustrated embodiment, the coil springs 24 are located between the support surface 21*a* of the nut 21 and the clamp pads 22. When the clamp bolts 23 are fastened, the coil springs 24 urge the clamp pads 22 upward from the support surface 21*a* of the nut 21. Thus, without removing the clamp pads 22, the strings 15 can be installed and tuned. If the coil springs 24 are not provided, the clamp pads 22 contact the strings 15 when the clamp bolts 23 are loosened. This hampers accurate tuning of the strings 15.

Further, tuning of the strings 15 can be maintained in a stable state when the strings 15 are being locked. In addition, the strings 15 are prevented from being shifted to offset positions when the clamp pads 22 are being fastened.

The support surface 21*a* of the nut 21 is inclined with respect to the upper side of the neck 13. The angle between the support surface 21*a* and the upper side of the neck 13 is smaller than the angle of portions of the strings 15 between the pegs 16 and the front edge of the nut 21, which corresponds to the first contact point P3, with respect to the upper side of the neck 13. Accordingly, the strings 15 are bent by the nut 21 at two positions (the first and third contact positions P1, P3). The strings 15 are thus prevented from being separated from the support surface 21*a* of the nut 21.

The illustrated embodiment may be modified as follows.

The height of the pegs 16, or the projecting amount of the pegs 16 from the upper side of the head 14, may be substantially minimized. In this case, the bending angle of the strings 15 at the third contact point P3 is increased. The strings 15 thus contact the nut 21 by an accordingly increased friction force.

The present examples and embodiments are to be considered as illustrative and not restrictive and the invention is not to be limited to the details given herein, but may be modified within the scope and equivalence of the appended claims.

What is claimed is:

1. An electric guitar (11) with a tremolo unit that adjusts tensions of strings at the same time, comprising:

a body, wherein the body fixes proximal ends of the strings;

a neck, which projects from the body, wherein the neck has an upper side that faces the strings;

a head, which is fixed to a distal end of the neck, wherein the head is bent downward from the upper side of the neck;

a plurality of pegs attached to the head, wherein each of the pegs is connected to a distal end of a different one of the strings; and a lock device fixed to the upper side of the neck for preventing the strings from being shifted to offset positions, wherein the lock device includes:

a nut, wherein the nut has a support surface that supports the strings, a rear edge close to the body, and a front edge close to the pegs, and the nut is located such that the front edge is located upward from a hypothetical line, which extends along a contact point between the strings and the pegs and the rear edge so that the strings form a first angle of inclination between the hypothetical line and a first line which extends along a contact point between the strings and the rear edge and between the strings and the front edge at the front edge of the nut and a second angle of inclination between the first line and a second line which extends along a contact point between the strings and the rear edge and between the strings and the tremolo unit at the rear edge of the nut, the first angle of inclination and the second angle of inclination being substantially equal;

a pad, wherein the pad presses at least one of the strings against the support surface; and a bolt, wherein the bolt connects the pad to the nut.

2. The electric guitar according to claim 1, wherein the support surface is a flat surface inclined with respect to the upper side of the neck.

3. The electric guitar according to claim 2, wherein:

a bending angle between the upper side of the neck and the head is in the range of from 10.0 to 18.0 degrees;

the support surface is inclined with respect to a hypothetical line that extends along a contact point between the tremolo unit and the strings and the rear edge of the nut at an angle of 2.0 to 12.5 degrees; and the support surface is inclined with respect to a hypothetical line that extends along a contact point between the strings and the pegs and the rear edge of the nut at an angle of 2.0 to 12.5 degrees.

4. The electric guitar according to claim 2, wherein:

a bending angle between the upper side of the neck and the head is 14.0 degrees;

the support surface is inclined with respect to a hypothetical line that extends along a contact point between the tremolo unit and the strings and the rear edge of the nut at an angle of 3.0 to 7.0 degrees; and the support surface is inclined with respect to a hypothetical line that extends along a contact point between the strings and the pegs and the rear edge of the nut at an angle of 3.0 to 7.0 degrees.

5. The electric guitar according to claim 1, wherein the pad includes at least two pressing projections that press at least one of the strings.

6. The electric guitar according to claim 1, wherein the lock device further includes an elastic member located between the support surface and the pad for urging the pad away from the support surface.

7. An electric guitar with a tremolo unit that adjusts tensions of strings at the same time, comprising:

a neck, wherein the neck has an upper side that faces the strings;

a plurality of pegs, wherein each of the pegs is connected to a distal end of a different one of the strings; and a nut, which is attached to the upper side of the neck, wherein the nut supports the strings such that the strings are substantially parallel with one another, the nut has a front edge close to the distal ends of the strings, a rear edge close to proximal ends of the strings, and a support surface formed between the front edge and the rear edge, the support surface is inclined with respect to the upper side of the neck at a predetermined angle, and the predetermined angle is smaller than an angle of portions of the strings between the pegs and the front edge with respect to the upper side of the neck so that the strings form angles at the front edge and at the rear edge that are substantially equal.

8. The electric guitar according to claim 7, further comprising:

a pad, wherein the pad presses at least one of the strings against the nut; and a bolt, wherein the bolt connects the pad to the nut.

9. The electric guitar according to claim 8, further comprising two pressing projections, which project from the pad, wherein the pressing projections cooperate with the nut to clamp the at least one of the strings.

10. The electric guitar according to claim 8, further comprising an elastic member, which is located between the nut and the pad in a compressed state.

11. An electric guitar with a tremolo unit, comprising:

a nut, which is attached to an upper side of a neck, wherein the nut supports strings such that the strings are substantially parallel with one another, the nut has a front edge close to distal ends of the strings and a rear edge close to proximal ends of the strings, and the strings are bent by the nut at the front edge and the rear edge so that the strings form an angle at the front edge substantially equal to an angle of the strings at the rear edge;

a pad, wherein the pad presses at least one of the strings against the nut; and a bolt, wherein the bolt connects the pad to the nut; and an elastic member, which is held between the nut and the pad in a compressed state.

* * * * *